Patented Dec. 17, 1935

2,024,611

UNITED STATES PATENT OFFICE 2,024,611

TREATMENT OF PIGMENTS

George F. A. Stutz and Harlan A. Depew, Palmerton, Pa., assignors to The New Jersey Zinc Company, New York, N. Y., a corporation of New Jersey No Drawing. Application January 23, 1931, Serial No. 510,765

10 Claims. (Cl. 134—58)

This invention relates to the treatment of inorganic pigments, and especially to that class of pigments produced by wet chemical precipitation. The invention aims to provide an improved method of drying and/or disintegrating pigments.

Various types of apparatus have heretofore been employed for drying pigments, but the principle of the drying operation has in general been the same in all types, involving merely the application of a relatively low degree of heat under approximately atmospheric pressure. In the ordinary drying of a filtered press-cake of a precipitated pigment, capillary forces tend to draw the pigment particles together as the water evaporates and the cake shrinks resulting in a dense dry material. While the character of the dry material depends to a large extent on the nature of the precipitate, it is practically always so hard and dense as to require subsequent mechanical disintegration. In some instances, the dry cake is so very hard that it cannot be broken up satisfactorily in a squirrel cage disintegrator. As heretofore commonly practiced, the drying and disintegrating operations have been conducted in separate and necessarily distinctly different types of apparatus.

Our present invention contemplates an improved method of drying a pigment so that little if any shrinkage takes place, thereby resulting in a relatively soft dry material readily amenable to disintegration. In its broad aspect, the invention involves, in this connection, exposing the wet pigment to a pressure considerably in excess of the atmospheric pressure and eliminating the moisture content of the pigment while so exposed to this pressure. In another aspect, the invention involves exposing the wet pigment to a predetermined pressure and a temperature corresponding approximately to that of saturated steam at such pressure and applying heat to the pigment under such conditions of pressure and temperature until the moisture content has been reduced to the desired extent. In its preferred aspect, the invention involves exposing the wet pigment in a closed chamber to a pressure considerably in excess of the atmospheric pressure at a temperature corresponding approximately to that of superheated steam at the prevailing pressure, and applying heat to the chamber while permitting the escape of steam therefrom until the moisture content of the pigment has been substantially reduced.

While the drying operation is ordinarily practiced for the removal of water from the pigment, it may be practiced for the removal of other liquids associated therewith. Thus, the pigment may be precipitated from non-aqueous solutions, and the drying operation may be conducted to free the resulting precipitate of the accompanying solvent or a resulting liquid product of chemical reaction. Accordingly, where we herein speak of water and steam it is to be understood that these are typical of various liquids and their vapors which may be associated with the pigment and which may be advantageously separated from the pigment in accordance with our present invention.

The invention also contemplates an improved method of disintegrating a pigment which involves exposing the pigment to a gaseous pressure considerably in excess of the atmospheric pressure, and then suddenly lowering the gaseous pressure to which the pigment is exposed whereby the resulting sudden gaseous expansion effectively disintegrates the pigment. The disintegrating operation may be conducted on an already dry pigment, but is preferably practiced in conjunction with the improved drying operation of the invention. In one of its preferred aspects, the pigment is exposed to a relatively high pressure and a temperature corresponding to that of saturated steam at the prevailing pressure, and the pigment is then rapidly delivered into an environment of substantially lower pressure where the resulting suddent expansion of the steam disintegrates the pigment.

In the practice of the invention, the wet pigment is exposed to the contemplated high pressure in an appropriate apparatus and heated while so exposed to this pressure to the necessary extent to drive off its moisture content. The temperature of the pigment is raised to the temperature of saturated steam under the prevailing pressure, and provision is made for the escape or withdrawal from the apparatus of the moisture evaporated from the pigment. The drying apparatus may advantageously be of the autoclave type provided with an appropriate automatic blow-off valve. The blow-off valve insures the maintenance of a constant uniform pressure and permits the escape of steam until the pigment has been dried to the desired extent.

When the drying of the pigment has been completed, very effective disintegration is brought about by suddenly releasing the pressure to which the pigment is exposed. This sudden release of pressure causes a sudden expansion of the gas (ordinarily water vapor) within the pigment mass, and this gaseous expansion breaks up the pigment mass and forces its particles apart. In practice, it is advantageous to suddenly deliver the pigment from the high pressure environment under which it has been dried into an environment of considerably lower pressure, whereby the two operations of drying and disintegrating are closely articulated.

Where the pigment in drying is exposed to a relatively high pressure and a temperature corresponding to that of saturated steam (or other vapor) at the prevailing pressure, a certain amount of heat treatment may be given the pigment in consequence of the temperature and pressure to which it is exposed. Where the effects of such a heat treatment are undesirable or even objectionable, the drying may be carried out at a predetermined pressure below that of the partial pressure of water or other solvent accompanying the pigment, with appropriate provision for the withdrawal from the heating apparatus of steam or vapor of the solvent accompanying the pigment.

The disintegrating operation of the invention may be separately practiced on a pigment naturally or otherwise dried in any appropriate manner. In such a case, the pigment is exposed to the contemplated high pressure in an atmosphere of an inert gas such as air, nitrogen or the like. The sudden release of the pressure to which the pigment is exposed causes a correspondingly sudden expansion of the gas and an effective disintegration of the pigment.

The sudden release of the pressure to which the pigment is exposed may be brought about in various ways. For example, the closed chamber in which the drying or disintegrating operation is being conducted may be suddenly opened to the substantially lower atmospheric pressure. It is generally preferable, in practice, however, to deliver the pigment from the high pressure chamber to an environment of considerably lower pressure. This delivery of the pigment from the high pressure chamber to the low pressure environment may be mechanically effected or the pigment may be blown from the high pressure chamber into the low pressure environment by the relatively higher pressure in the chamber. In any case, the aim is to so suddenly release the pressure to which the pigment is exposed that the gas associated with the pigment expands with explosive violence, thereby scattering and disseminating the particles of the pigment.

A substantial elimination of moisture from a wet pigment can be brought about by exposing the pigment to a pressure substantially in excess of the atmospheric pressure and heating to a temperature in excess of the boiling temperature of water (100° C.), and then suddenly lowering or releasing the pressure to which the pigment is exposed. Upon such a sudden lowering of the pressure, the moisture between the pigment particles (at a temperature above 100° C.) has a low force of capillary attraction, because the surface tension is low, and, at the same time, has a tendency to burst into steam forcing the particles apart by the expansion of the vapor. A consideration of the steam tables shows that the total heat of the liquid becomes greater at higher temperatures and the latent heat of evaporation becomes less. Accordingly, the pigment can be dried most completely by working at high temperatures. If only the total heat of the liquid were available, it would be impracticable even at the critical temperature to completely dry a wet pigment by this method of suddenly lowering or releasing the pressure to which it is exposed. However, in addition to the total heat of the liquid, there is also available the total heat of the solid pigment. The total heat of the liquid and of the pigment together may be great enough to completely dry the pigment by this method, where the pigment-liquid ratio is sufficiently high.

In practice it is generally preferable to supply a certain amount of the heat required for drying in some other manner than by the total heat of the liquid and of the solid pigment, thereby permitting lower operating pressures, or lower temperatures, or both. This may be accomplished by delivering the pigment from its high pressure environment into an appropriately heated low pressure environment, as for example a hot chamber, preferably maintained under a slight suction; by subjecting the pigment to hot gases during or immediately following its delivery to the low pressure stage of the drying treatment; or by reducing the amount of moisture that must be eliminated from the pigment by the sudden lowering or release of the pressure to which the pigment is exposed.

The particular condition of pressure and temperature utilized in drying a pigment in accordance with the invention may be widely varied to suit the particular case in hand. Thus, pressures of 100 to 3000, and higher, pounds per square inch may be used with advantage. While higher temperatures are conducive to faster and more complete drying, the heat treatment effects of such high temperatures are frequently objectionable. In general, we prefer to use as high a temperature as is economically and otherwise practicable. Very satisfactory results have been obtained with pressures of from 300 to 1200 pounds per square inch, and temperatures of about 200 to 300° C.

The optimum effects of disintegration are attained when the lowering of the pressure is substantial, say several hundred pounds per square inch. The greater is this lowering of pressure, the more explosive is the resulting gaseous expansion and hence its disintegrating effect upon the pigment particles. Pressures of 1000 pounds per square inch and higher suddenly lowered or released to atmospheric pressure give very satisfactory disintegrating results. In practice, pressures as high as 3500 pounds per square inch have been used with advantage, particularly in disintegrating without heating an already dry or dried pigment. Where the disintegrating treatment directly follows the drying treatment, the pressure during the latter should be adequately high for the former.

Pigments dried in accordance with the invention are of remarkably soft texture, substantially free of hard aggregates of pigment particles, and therefore readily amenable to disintegration. This seems to be due to the fact that the pigment mass undergoes little appreciable shrinkage and cementing together of particles in the course of the improved drying treatment. The relatively soft product of this drying treatment may be readily disintegrated in any appropriate manner, but is particularly amenable to the disintegrating treatment of the invention. The disintegration effected by the practice of the invention is as good and generally better than produced by the heretofore customary mechanical devices, such as the common squirrel cage disintegrator.

We claim:—

1. The improvement in the drying of an inorganic pigment obtained by wet precipitation, which comprises exposing the pigment in a closed chamber to a pressure considerably in excess of the atmospheric pressure, heating the pigment while so exposed to said pressure to a sufficiently high temperature to volatilize substantially all the liquid associated with the pigment, and permitting the escape from said chamber of the resulting vapor while the pigment remains exposed to its elevated pressure.

2. The improvement in the drying of an inorganic pigment obtained by wet precipitation, which comprises exposing the pigment in a closed chamber to a pressure of at least 1000 pounds per square inch, heating the pigment while so exposed to said pressure to a sufficiently high temperature to volatilize substantially all the liquid associated with the pigment, and permitting the escape from said chamber of the resulting vapor while the pigment is maintained at a constant uniform elevated pressure.

3. The improvement in the drying of an inorganic pigment which comprises exposing the pigment in a closed chamber to a pressure considerably in excess of the atmospheric pressure and a temperature corresponding approximately to that of saturated steam at the prevailing pressure, and applying heat to said chamber while permitting the escape of steam therefrom until substantially all of the moisture content of the pigment has been removed.

4. The improvement in the drying of an inorganic pigment which comprises exposing the pigment in a closed chamber to a pressure considerably in excess of the atmospheric pressure at a temperature corresponding approximately to that of saturated steam at the prevailing pressure, applying heat to said chamber while permitting the escape of steam therefrom until the moisture content of the pigment has been substantially reduced, and then suddenly lowering the pressure to which the pigment is exposed and thereby effecting the evaporation of a further substantial amount of its moisture content.

5. The improvement in the drying of an inorganic pigment obtained by wet precipitation, which comprises exposing the pigment in a closed chamber to a predetermined condition of pressure in excess of atmospheric pressure and a temperature corresponding approximately to that of saturated steam at said predetermined pressure, and applying heat to said chamber while permitting the escape of steam therefrom until substantially all of the moisture content of the pigment has been removed.

6. The improvement in the drying and disintegration of an inorganic pigment, which comprises exposing the pigment in a closed chamber to a pressure considerably in excess of the atmospheric pressure and a temperature corresponding approximately to that of saturated steam at the prevailing pressure, applying heat to said chamber while permitting the escape of steam therefrom until the moisture content of the pigment has been reduced substantially, and then suddenly lowering the pressure to which the pigment is exposed.

7. The improvement in the drying and disintegration of an inorganic pigment, which comprises exposing the pigment in a closed chamber to a pressure considerably in excess of the atmospheric pressure, heating the pigment while so exposed to said pressure to a sufficiently high temperature to evaporate a portion of the liquid associated therewith while permitting the escape from the chamber of the resulting vapor, and then suddenly lowering the pressure to which the pigment is exposed.

8. The improvement in the drying of a wet mass of inorganic pigment particles which comprises exposing the wet mass in a closed chamber to a pressure considerably in excess of the atmospheric pressure, heating the mass while so exposed to said pressure to a sufficiently high temperature to evaporate a substantial portion of the liquid associated with said mass of inorganic pigment particles while permitting the escape from the chamber of the moisture so evaporated, and then suddenly lowering the pressure to which the mass is exposed to effect substantially complete drying of the inorganic pigment particles.

9. The improvement in the drying and separation of a wet mass of discrete pigment particles obtained by wet precipitation which comprises exposing the wet mass in a closed chamber to a gaseous pressure of at least 1000 lbs. per square inch, heating the pigment while so exposed to said pressure to a sufficiently high temperature to evaporate a substantial part of the liquid associated with the inorganic pigment particles while permitting the escape of the resulting vapor from the chamber, and then rapidly delivering the mass of pigment particles into an environment of substantially lower pressure, whereby the sudden gaseous expansion separates the mass into its discrete particles.

10. The improvement in the drying of a wet mass of discrete pigment particles which comprises heating the wet mass in an enclosure under an elevated pressure considerably above atmospheric pressure until a sufficient amount of the liquid associated with the particles is vaporized to leave the pigment in a form such that it readily is amenable to disintegration, and permitting the gradual escape of a substantial portion of the resulting vapor from the enclosure while the mass is subjected to said elevated pressure.

GEORGE F. A. STUTZ.
HARLAN A. DEPEW.